United States Patent
Daddis, Jr. et al.

(10) Patent No.: US 10,001,430 B2
(45) Date of Patent: Jun. 19, 2018

(54) ENVIRONMENTAL CONDITIONING UNIT TESTING

(71) Applicant: Carrier Corporation, Farmington, CT (US)

(72) Inventors: Eugene Duane Daddis, Jr., Manlius, NY (US); Christopher A. Jones, Baldwinsville, NY (US); Allen L. Wells, Clay, NY (US); Michael R. Cote, Terryville, CT (US)

(73) Assignee: CARRIER CORPORATION, Farmington, CT (US)

( * ) Notice: Subject to any disclaimer, the term of this patent is extended or adjusted under 35 U.S.C. 154(b) by 617 days.

(21) Appl. No.: 14/496,461

(22) Filed: Sep. 25, 2014

(65) Prior Publication Data

US 2015/0094986 A1    Apr. 2, 2015

Related U.S. Application Data

(60) Provisional application No. 61/883,765, filed on Sep. 27, 2013.

(51) Int. Cl.
*G01M 99/00* (2011.01)

(52) U.S. Cl.
CPC ........ *G01M 99/005* (2013.01); *G01M 99/008* (2013.01)

(58) Field of Classification Search
CPC .. G05B 15/02; G05B 19/042; G05B 23/0235; H04L 67/12; H04L 67/125; F24F 11/0086; F24F 11/006

(Continued)

(56) References Cited

U.S. PATENT DOCUMENTS 3,890,836 A    6/1975 McKenzie
4,381,549 A    4/1983 Stamp, Jr.
(Continued)

FOREIGN PATENT DOCUMENTS

GB    2062919 A    5/1981

OTHER PUBLICATIONS

Comstock, et al. "Literature Review for Applicaiton of Fault Detection and Diagnostic Methods to Vapor Compression Cooling Equipment". http://www.nist.gov/tc75/1043-RP_FD-D_Literature_Review.pdf. Dec. 1999. 86 pages.

*Primary Examiner* — Roy Y Yi
*Assistant Examiner* — Jeffrey Aiello
(74) *Attorney, Agent, or Firm* — Cantor Colburn LLP

(57) ABSTRACT

An air conditioning unit test system includes an a multi-sub-system air conditioning assembly including a plurality of sub-systems for conditioning an indoor environment. The a multi-sub-system air conditioning assembly includes a control board having control circuitry for controlling the plurality of sub-systems. The air conditioning unit test system includes a remote test communications device connected to the control board via a data communications link. The control board is configured to perform a configuration of tests for testing sub-systems of the multi-sub-system air conditioning assembly based on receiving a test request from the remote test communications device, to test the sub-systems based on the configuration of the tests, and to transmit results of the tests to the remote test communications device.

17 Claims, 2 Drawing Sheets

(58) Field of Classification Search
USPC ...... 700/19, 28, 276; 702/182, 183; 709/224
See application file for complete search history.

(56) References Cited

U.S. PATENT DOCUMENTS

| | | | |
|---|---|---|---|
| 4,448,033 A | 5/1984 | Briccetti | |
| 4,538,419 A | 9/1985 | Lord | |
| 4,798,055 A | 1/1989 | Murray | |
| 4,964,126 A | 10/1990 | Musicus | |
| 5,210,757 A * | 5/1993 | Barlow | G06F 11/22 714/25 |
| 5,566,091 A | 10/1996 | Schricker | |
| 6,553,774 B1 | 4/2003 | Ishio | |
| 6,629,420 B2 | 10/2003 | Renders | |
| 6,988,670 B2 | 1/2006 | Keen | |
| 7,079,967 B2 | 7/2006 | Rossi | |
| 7,596,373 B2 * | 9/2009 | McGregor | H04W 24/00 455/418 |
| 7,905,098 B2 | 3/2011 | Pham | |
| 8,085,144 B2 * | 12/2011 | Appelt | A61B 5/02055 128/201.22 |
| 8,995,992 B1 * | 3/2015 | Cohen | H04W 24/06 455/410 |
| 2004/0034498 A1 * | 2/2004 | Shah | G01R 19/2516 702/127 |
| 2009/0255281 A1 | 10/2009 | Lifson | |
| 2014/0032637 A1 * | 1/2014 | Weir | G01R 31/2834 709/203 |
| 2014/0162609 A1 * | 6/2014 | Chien | H04W 4/043 455/414.1 |
| 2014/0312128 A1 * | 10/2014 | Matsuoka | G05B 17/02 236/51 |
| 2014/0351010 A1 * | 11/2014 | Kong | G05F 1/66 705/7.29 |
| 2015/0148966 A1 * | 5/2015 | Suzuki | F24F 11/0009 700/276 |

* cited by examiner

ENVIRONMENTAL CONDITIONING UNIT TESTING

CROSS-REFERENCE TO RELATED APPLICATION

This application claims the benefit of U.S. provisional patent application Ser. No. 61/883,765 filed Sep. 27, 2013, the entire contents of which are incorporated herein by reference.

BACKGROUND OF THE INVENTION

Embodiments of the invention relate to environmental conditioning units and, in particular, to automated testing of rooftop environmental conditioning units.

Large rooftop (LRT) air conditioning units are relatively large units that provide environmental conditioning of buildings. LRTs include various sub-systems including multiple compressors, one or more economizers, heating systems, de-humidification systems, and supporting electrical systems. During commissioning of the LRT or service calls, technicians need to manually test each system to determine whether systems are faulty or operating normally.

BRIEF DESCRIPTION OF THE INVENTION

Embodiments of the invention include an environmental conditioning unit test system including a multi-sub-system air conditioning assembly including a plurality of sub-systems for conditioning an indoor environment. The multi-sub-system air conditioning assembly includes a control board having control circuitry for controlling the plurality of sub-systems. The system includes a remote test communications device connected to the control board via a data communications link. The control board is configured to perform a configuration of tests for testing sub-systems of the multi-sub-system air conditioning assembly based on receiving a test request from the remote test communications device, to test the sub-systems based on the configuration of the tests, and to transmit results of the tests to the remote test communications device.

Additional embodiments include a control board of a multi-sub-system environmental conditioning unit. The control board includes memory having stored therein configuration information of sub-systems of the multi-sub-system environmental conditioning unit and an input/output (I/O) module configured to receive a test initiation request and transmit test result information. The control board also includes a processor to receive the test initiation request, access the configuration information, initiate testing of the sub-systems of the multi-sub-system environmental conditioning unit based on the configuration information, obtain the testing results from sensors monitoring the sub-systems, and transmit the test result information to the I/O module to output to an externally-connected device.

Additional embodiments include a method including receiving a request to test a class of sub-systems of a multi-sub-system environmental conditioning unit and accessing configuration information of the multi-sub-system environmental conditioning unit stored in a control board of the multi-sub-system environmental conditioning unit. The method further includes generating tests to perform on the sub-systems within the requested class of sub-systems based on the configuration information, conducting the tests on the sub-systems, and generating test results data based on conducting the tests.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Large rooftop (LRT) air conditioning units include multiple subsystems that need to be tested for servicing or commissioning. The testing and commissioning of the LRT is time-consuming, and manual testing may be subject to errors. Embodiments of the invention are directed to automated testing of LRT environmental conditioning units.

Figure 1:
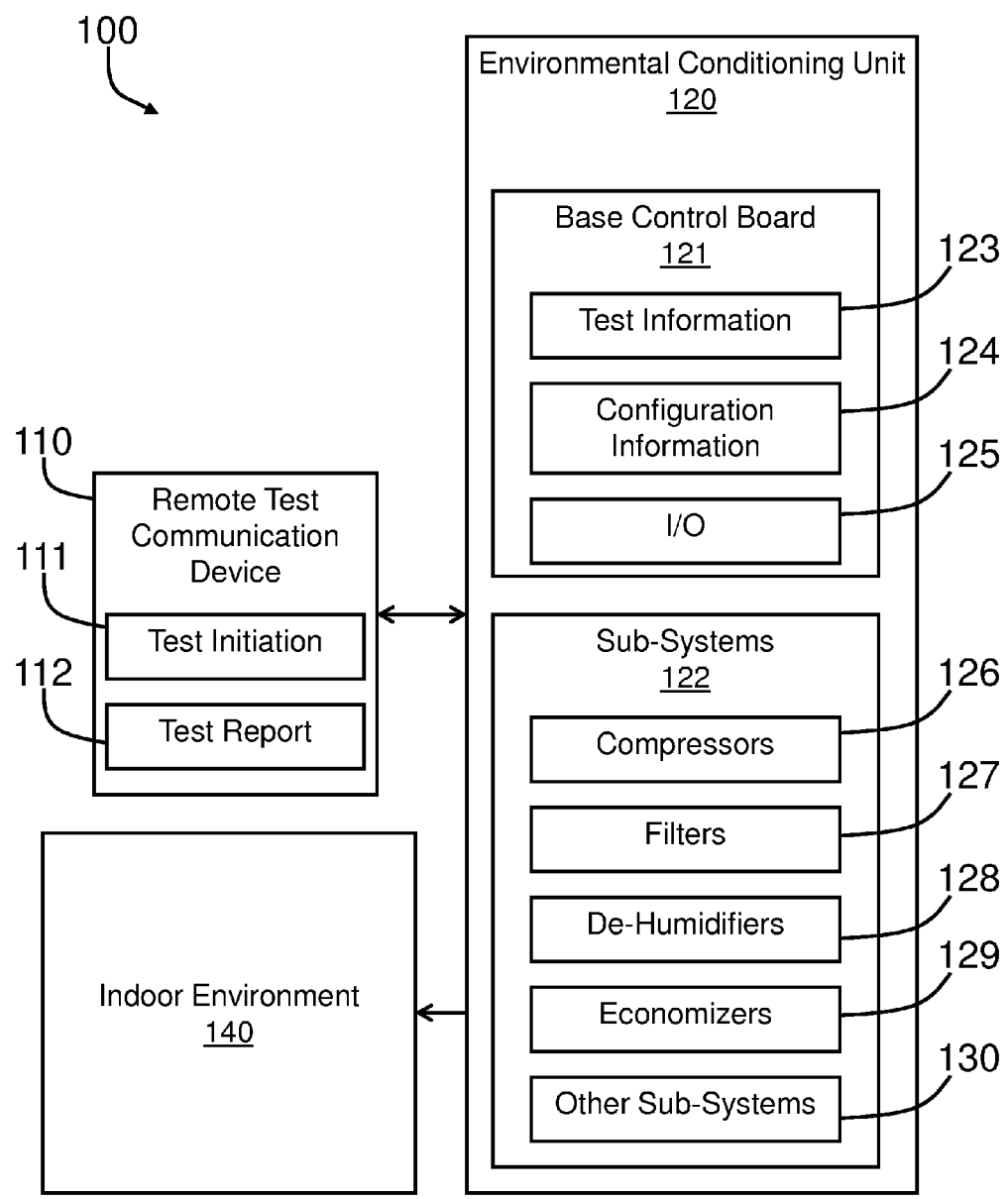
FIG. 1 illustrates a multi-sub-system environmental conditioning unit testing system according to an embodiment of the invention.

FIG. 1 illustrates a multi-sub-system environmental conditioning unit test system 100 according to an embodiment of the invention. The system 100 includes a remote test communication device 110 that connects to a multi-system environmental conditioning unit 120. In one embodiment, the multi-sub-system environmental conditioning unit 120 is a large rooftop (LRT) environmental conditioning unit. The environmental conditioning unit 120 conditions an indoor environment 140, including heating, cooling and de-humidifying the indoor environment. The remote test communication device 110 may be any device that is not part of the environmental conditioning unit 120, but which is connected to the environmental conditioning unit 120 via a data communications link. Examples of remote test communication devices include handheld devices, laptops, tablet computers, remote desktop computers and any other device capable of transmitting a test initiation signal and receiving reporting information.

In addition, while the remote test communication device 110 is illustrated in FIG. 1 as one block, embodiments of the invention encompass multiple devices that work together to form the remote test communication device 110. For example, the remote test communication device 110 may include a handheld device to initiate the tests by a test operator, and the test report 112 may be transmitted to a different remote computer, such as a personal computer, server or other computer.

The environmental conditioning unit 120 includes a base control board 121, which includes one or more processors, memory and supporting logic and hardware. The environmental conditioning unit 120 includes sub-systems 122, including one or more compressors 126, filters 127, de-humidifiers 128, economizers 129 and other sub-systems 130 including fans and other systems. The environmental conditioning unit 120 is configured to provide robust environmental conditioning to the indoor environment 140, including stepped heating and cooling (i.e. providing air into the indoor environment at different heating temperatures and different cooling temperatures, according to environmental conditioning settings, energy-usage settings, requirements of the indoor environment, and outdoor temperatures), lowtemperature cooling, such as around thirty-two degrees Fahrenheit, and conditioning of an entire building or multiple floors or levels of a building. In other words, the environmental conditioning unit 120 differs from residential air conditioners in complexity of systems, in power, in size, in components, and various other features well-known in the art.

The base control board 121 stores in memory test information 123, which includes information regarding how tests are to be performed on the sub-systems 122 and information about completed tests. The base control board 121 also includes configuration information 124 describing the types and number of sub-systems 122 present in the environmental conditioning unit 120. The base control board also includes an input/output (I/O) module 125 that communicates with external devices, and in particular with the remote test communication device 110. The I/O module 125 may be a wired connection or a wireless connection.

In operation, the remote test communication device 110 receives a user input to generate the test initiation instruction 111, which is transmitted to the base control board 121. The test initiation instruction 111 may be initiated, for example, by a user pressing one or more selection icons, buttons, or other input features. In one embodiment, the test initiation 111 is generated at a start-up of the environmental conditioning unit 120. In another embodiment, the test initiation instruction 111 is generated when an operator responds to a service call or maintenance call during the lifetime of the environmental conditioning unit 120. In yet another embodiment, the test initiation instruction 111 instructs the base control board 121 to perform regular or periodic testing of the sub-systems 122 without further user input between tests.

Upon receiving the instruction to initiate tests, the base control board 121 configures the tests to be performed. The base control board 121 utilizes the configuration information, including a number and type of compressors 126, filters 127, de-humidifiers 128, economizers 129 and other sub-systems 130 to configure the tests. The configuration may be performed without any additional user input after initiating the test. For example, an operator may provide an instruction to test the compressors 126. The base control board 121 receives the instruction via the I/O module 125, refers to the configuration information to determine the number and type of compressors, as well as sensor information and any other information necessary to perform tests, and then the base control board 121 initiates the test of the compressors 126. Tests may be performed in any manner, including turning on and off sub-systems, applying varying levels of power to the sub-systems 122, turning on an off sub-systems 122 at a predetermined rate, or in any other manner. In one embodiment, after the base control board 121 configures the test to be performed, the test information may be provided to the remote test communication device 110 for further user input or modification prior to beginning the test.

Upon completion of the test, the base control board 121 stores the test results with the test information 123 and transmits the test report 112 to the remote test communication device.

Figure 2:
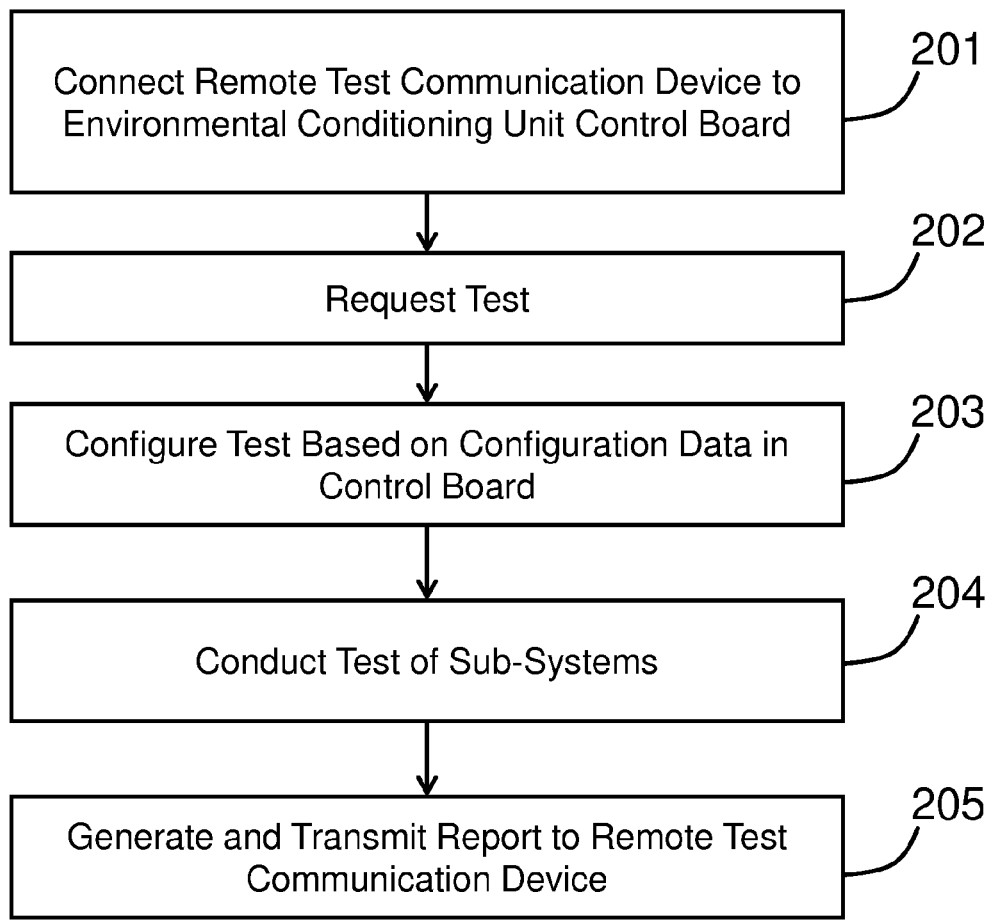
FIG. 2 is a flow diagram of a method according to an embodiment of the invention.

FIG. 2 is a flow chart of a method according to an embodiment of the invention. In block 201, a remote test communication device is connected to an environmental conditioning unit control board. The connection may be a wired, physical connection, or the connection may be a wireless data connection. In block 202, the remote test communication device requests one or more tests of sub-systems. The test request may be generated based on a user selection on the remote test communication device. For example, an operator may review a menu of functions or sub-systems and may select one or more functions or sub-systems to be tested by selecting an icon or word representing the functions or sub-systems.

In block 203, the control board configures one or more tests to be performed on the sub-systems based on the test request. The control board stores configuration data about the sub-systems and configures the tests based on the configuration data. For example, if a test request is selected to test "cooling systems," the control board refers to the configuration information to determine each sub-system associated with cooling. The configuration information may include a number of components in the sub-systems, the types of components, information about sensors that sense operating characteristics of the components, and any other information regarding the configuration of the sub-systems necessary to test the sub-systems.

In block 204, the control board controls the sub-systems to perform the selected tests. The tests may include turning on and/or off the sub-systems, detecting temperatures, voltages, current, power or any other characteristics, operating the sub-systems within a predetermined range of conditions, or any other tests necessary to determine operating information of the sub-systems. The conducted tests are based on the configuration information stored in the control board, and the test plans generated by the control board.

Finally, in block 205 a report of the test results is generated and sent to the remote test communication device. The results may be transmitted immediately upon completion of the tests or may be stored by the control board until requested by the remote test communication device.

In embodiments of the invention, tests of sub-systems of an environmental conditioning unit are automatically configured and run by a control board. In one embodiment, the control board stores configuration information about the numbers and types of sub-systems in the environmental conditioning unit, information about sensors that provide test data, and information about the types of tests that are run on the environmental conditioning unit sub-systems to test the sub-systems. In additional embodiments, one or more of the configuration information, sensor information and test information may be provided from an external source, such as a remote test communication device that is connected to the control board via a data link.

In one embodiment, a remote test communication device receives an input from a user to initiate a test and transmits a test-initiation request to the control board. The control board analyzes the test request and references the configuration information to generate the appropriate tests of the sub-systems according to the request. The control board runs the tests of the sub-systems and returns a test report to the remote test communication device. In such an embodiment, one set of tests is performed and one set of reports generated for each test initiation request. In another embodiment, after receiving the test initiation request, the control board may periodically conduct tests and generate reports of the results. The control board may periodically transmit the reports to the remote test communication device, without receiving any user input to initiate the next periodic set of tests. Alternatively, the control board may store the report information until the report information is requested by the remote test communication device.

In embodiments of the invention, a user of the remote test communication device may select general classes of tests to be performed, such as "cooling" and "heating" or classes of sub-systems, such as "compressors," "filters," or "de-humidifiers." The user need not determine the number and type of sub-systems. Instead, a test initiation request including the classes of sub-systems to be tested is provided to the control board of the environmental conditioning unit, and the control board generates the appropriate tests to perform on the selected sub-systems according to configuration information including the type of sub-system components (e.g., the specific make an model of the sub-system components, such as the make an model of compressors, filters, de-humidifiers, etc.) and the number of the selected sub-systems (e.g., the number of compressors, filters, de-humidifiers, etc.)

In embodiments of the invention, the test is initiated by the remote test communication device by connecting the remote test communication device to the control board via a data communication link. The data communication link is a communication link that transmits digital data or other electronic data, and may include a wired data connection, such as universal serial bus (USB), Ethernet, or other wired connection. The data communication link may also be a wireless communication link.

While an embodiment of the invention has been illustrated with only one environmental conditioning unit 120 in FIG. 1, embodiments of the invention encompass remote test communication devices 110 that communicate with multiple environmental conditioning units 120 to initiate tests, and embodiments include environmental conditioning units 120 connected to networks of multiple environmental conditioning units 120 and multiple remote test communication devices 110.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. An environmental conditioning unit test system, comprising:
   a multi-sub-system air-conditioning assembly including a plurality of sub-systems for conditioning an indoor environment, the multi-sub-system air-conditioning assembly including a control board having control circuitry for controlling the plurality of sub-systems, wherein the control board stores configuration information about the plurality of sub-systems, sensor information about at least one sensor for providing test data and test information for testing the plurality of sub-systems; and
   a remote test communications device connected to the control board via a data communications link,
   wherein the control board is configured to automatically perform a configuration of tests for testing sub-systems of the multi-sub-system air-conditioning assembly using the configuration information, sensor information, and test information in response to a test request received from the remote test communications device, to test the sub-systems based on the configuration of the tests, and to transmit results of the tests to the remote test communications device.

2. The environmental conditioning unit test system of claim 1, wherein the remote test communication device is a hand-held device connected to the multi-sub-system air-conditioning assembly.

3. The environmental conditioning unit test system of claim 1, wherein the remote test communications device is a personal computer connected to the multi-sub-system air-conditioning assembly via a data communications network.

4. The environmental conditioning unit test system of claim 1, wherein the control board includes memory and a processing circuit, the memory storing configuration data including a description of the sub-systems present in the multi-sub-system air-conditioning assembly, and
   the control board performs the configuration of the tests by referencing the configuration data.

5. The environmental conditioning unit test system of claim 1, wherein the control board is configured to test the sub-systems periodically without receiving user input to perform the tests between each periodic test.

6. A control board of a multi-sub-system environmental conditioning unit, comprising:
   memory having stored therein configuration information of sub-systems of the multi-sub-system environmental conditioning unit, sensor information about at least one sensor for providing test data and test information for testing the sub-systems;
   an input/output (I/O) module configured to receive a test initiation request and transmit test result information; and
   a processor configured to receive the test initiation request, and in response to receiving the test initiation request automatically access the configuration information, configure and initiate testing of the sub-systems of the multi-sub-system environmental conditioning unit based on the configuration information, sensor information and test information, obtain the testing results from sensors monitoring the sub-systems, and transmit the test result information to the I/O module to output to an externally-connected device.

7. The control board of claim 6, wherein the processor is configured to receive a test initiation request to test a class of sub-systems and to perform pre-determined tests on each of the sub-systems of the class of sub-systems based on receiving the test initiation request.

8. The control board of claim 6, wherein the test initiation request is a request to perform periodic testing of the sub-systems without receiving user input to perform the periodic testing between the periodic tests.

9. The control board of claim 8, wherein the processor is configured to transmit the test result information to the I/O module automatically without receiving user input to transmit the test result information to the I/O module.

10. The control board of claim 6, wherein the test initiation request includes a request to test a class of sub-systems, and the configuration information includes information regarding a number, type and configuration of the sub-systems of the multi-sub-system environmental conditioning unit that are in the class requested by the test initiation request.

11. A method comprising:
    receiving a request to test a class of sub-systems of a multi-sub-system environmental conditioning unit;
    accessing configuration information, sensor information, and test information of the multi-sub-system environmental conditioning unit stored in a control board of the multi-sub-system environmental conditioning unit;

generating tests to perform on the sub-systems within the requested class of sub-systems based on the configuration information, sensor information, and test information;

conducting the tests on the sub-systems;

generating test results data based on conducting the tests; and transmitting the test results data to an external device; wherein accessing configuration information, generating tests to perform on the sub-systems, conducting the tests, and generating test results data occurs automatically in response to receiving the request to test a class of subsystems.

12. The method of claim 11, wherein only one set of test results data is generated based on conducting the tests on the sub-systems for each request to test the class of sub-systems.

13. The method of claim 11, wherein the tests are conducted periodically and the tests results data are generated periodically based on receiving only one request to test the class of sub-systems.

14. The method of claim 11, wherein the request is received based on having a wire connected to a data transmission slot of the control board of the multi-sub-system environmental conditioning unit.

15. The method of claim 11, wherein the request is received via a wireless data communications receiver on the multi-sub-system environmental conditioning unit control board.

16. The method of claim 11, wherein generating the test results data includes providing an identifier for each sub-system and an indication of whether the sub-system is faulty.

17. The method of claim 11, wherein the class of sub-systems includes at least one of compressors, filters, de-humidifiers, economizers, and fans, and the configuration information includes a number and type of each of the at least one compressors, filters, de-humidifiers, economizers and fans.

* * * * *